United States Patent
Yagi et al.

(10) Patent No.: US 9,538,602 B2
(45) Date of Patent: Jan. 3, 2017

(54) LIGHTING CONTROL DEVICE AND LIGHTING CONTROL METHOD

(71) Applicant: Panasonic Intellectual Property Management Co., Ltd., Osaka (JP)

(72) Inventors: Sana Yagi, Osaka (JP); Tatsumi Setomoto, Osaka (JP); Akihiro Kishimoto, Osaka (JP); Toshiya Moriwaki, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/041,520

(22) Filed: Feb. 11, 2016

(65) Prior Publication Data

US 2016/0270181 A1    Sep. 15, 2016

(30) Foreign Application Priority Data

Mar. 11, 2015   (JP) .................................. 2015-048887

(51) Int. Cl.
   *H05B 37/02*   (2006.01)
   *H05B 33/08*   (2006.01)

(52) U.S. Cl.
   CPC ...... *H05B 33/0863* (2013.01); *H05B 33/0872* (2013.01); *H05B 37/0272* (2013.01)

(58) Field of Classification Search
   CPC .................... H05B 33/0872; H05B 37/0272
   USPC ....... 315/149, 158, 291, 294, 297, 307, 312; 345/581, 589, 591, 593–594, 597, 690
   See application file for complete search history.

(56) References Cited

U.S. PATENT DOCUMENTS

| | | | |
|---|---|---|---|
| 8,183,785 B2 | 5/2012 | Boleko Ribas et al. | |
| 2010/0235309 A1 | 9/2010 | Boleko Ribas et al. | |
| 2013/0258360 A1* | 10/2013 | Koh | G09G 5/026 358/1.9 |
| 2014/0239816 A1* | 8/2014 | Lee | H05B 33/0842 315/130 |
| 2014/0339988 A1* | 11/2014 | Nishigaki | H05B 37/0218 315/153 |
| 2015/0008827 A1* | 1/2015 | Carrigan | H05B 33/0842 315/131 |

(Continued)

FOREIGN PATENT DOCUMENTS

| | | |
|---|---|---|
| JP | 2009-021847 A | 1/2009 |
| JP | 2009-543278 A | 12/2009 |

(Continued)

*Primary Examiner* — Jason M Crawford
(74) *Attorney, Agent, or Firm* — Renner, Otto, Boisselle & Sklar, LLP

(57) ABSTRACT

A lighting control device includes: a candidate color selector; a candidate color adjuster; and a color controller. The candidate color selector selects, in accordance with the indication obtained by the indication obtainer, a plurality of candidate colors to be used for color control of lighting devices, from an image obtained by an image obtainer. The candidate color adjuster makes automatic-mode adjustment which is processing for determining colors reproducible by the lighting devices, in accordance with predetermined indexes and based on the plurality of candidate colors selected by the candidate color selector. The color controller causes the lighting devices to each emit illumination light having the color determined by the candidate color adjuster, by controlling the lighting devices.

9 Claims, 13 Drawing Sheets

(56) References Cited

U.S. PATENT DOCUMENTS

| | | | | |
|---|---|---|---|---|
| 2015/0015165 A1* | 1/2015 | Engelen | ............. | H04B 10/1143 315/294 |
| 2015/0076993 A1* | 3/2015 | Mohan | ................. | G01S 5/0027 315/153 |
| 2015/0195883 A1* | 7/2015 | Harris | ................ | H05B 33/0845 315/155 |
| 2015/0230320 A1* | 8/2015 | Gritti | ................ | H05B 37/0245 340/12.3 |

FOREIGN PATENT DOCUMENTS

| | | |
|---|---|---|
| JP | 2013-065465 A | 4/2013 |
| JP | 2014-179286 A | 9/2014 |
| JP | 2014-222652 A | 11/2014 |
| WO | WO 2008-001259 A2 | 1/2008 |

* cited by examiner

LIGHTING CONTROL DEVICE AND LIGHTING CONTROL METHOD

CROSS REFERENCE TO RELATED APPLICATION

This application claims the benefit of priority of Japanese Patent Application Number 2015-048887 filed on Mar. 11, 2015, the entire content of which is hereby incorporated by reference.

BACKGROUND

1. Technical Field

The present disclosure relates to a lighting control device and a lighting control method, and in particular relates to a lighting control device which is included in a mobile terminal and controls a lighting device, and a lighting control method.

2. Description of the Related Art

As light-emitting diode (LED) lights are widely used, a lighting control technique has been commonly adopted, and a new system for making a space appear pleasant is now created in which plural lights are controlled and wireless communication and a sensor are used, in addition to high-value added lighting devices having, for instance, dimming and color control functions.

Furthermore, along with the widespread use of smartphones, consumer-electronics products for which smartphones can be used as devices that control the products are now on the market. Also, an increasing number of LED lighting products can be directly controlled using iOS™ and Android™ devices, such as smartphones and tablet terminals, so that the products emit desired light.

In such circumstances, conventionally, a lighting system has already been disclosed (for example, see Japanese Unexamined Patent Application Publication No. 2013-65465) which reproduces, using full color lighting, a color selected from a preferred picture.

SUMMARY

With the technique disclosed in Japanese Unexamined Patent Application Publication No. 2013-65465, however, if an operator wishes to reproduce a color in a picture in an illumination space inside a house by selecting a preferred color from the picture, an operator him/herself needs to select a color from the picture. However, the color selected through this operation may not appear pleasant to human eyes when the color is reproduced in the illumination space. Furthermore, a lighting system needs to be a full color lighting system, in order to reproduce the selected color. Yet, such a lighting system is not installed in many houses, and thus reproducing the selected color is not easy. Focusing only on lighting devices widely used at present, how much such a selected color can be reproduced differs depending on the position where a device is disposed and the type of the device according to which whether color control and/or dimming can be performed and a color temperature of light that can be output are determined, and thus it is difficult for the operator to be aware of all such parameters and then input information.

In view of this, the present disclosure provides a lighting control device for creating an illumination space based on an image such as a picture, which automatically achieves an illumination space that appears pleasant to human eyes while an operator freely makes selection, and a lighting control method.

In order to provide the aforementioned lighting control device, a lighting control device according an aspect of the present disclosure is a lighting control device which is included in a mobile terminal and controls a lighting device, the lighting control device including: an image obtainer which obtains an image; an indication obtainer which obtains an indication from an operator; and a controller which controls the lighting device, wherein the controller includes: a candidate color selector which selects, in accordance with the indication obtained by the indication obtainer, a plurality of candidate colors to be used for color control of the lighting device, from the image obtained by the image obtainer; a candidate color adjuster which makes automatic-mode adjustment which is processing for determining a color reproducible by the lighting device, in accordance with a predetermined index and based on the plurality of candidate colors selected by the candidate color selector; and a color controller which causes the lighting device to emit illumination light having the color determined by the candidate color adjuster, by controlling the lighting device.

In order to provide the aforementioned lighting control method, a lighting control method according an aspect of the present disclosure is a lighting control method for controlling a lighting device using a mobile terminal, the lighting control method including: (a) obtaining an image; (b) obtaining an indication from an operator; and (c) controlling the lighting device, wherein step (c) includes: (c-i) selecting, in accordance with the indication obtained in step (b), a plurality of candidate colors to be used for color control of the lighting device, from the image obtained in step (a); (c-ii) making automatic-mode adjustment which is processing for determining a color reproducible by the lighting device, in accordance with a predetermined index and based on the plurality of candidate colors selected in step (c-i); and (c-iii) causing the lighting device to emit illumination light having the color determined in step (c-ii), by controlling the lighting device.

Note that the present disclosure can be achieved not only as the lighting control device and the lighting control method, but also as a program for causing a computer to execute the lighting control method. Furthermore, the present disclosure can be achieved also as a computer-readable recording medium storing the program such as a DVD.

The present disclosure provides a lighting control device for creating an illumination space based on an image such as a picture, which automatically achieves an illumination space that appears pleasant to human eyes while an operator can freely make selection, and a lighting control method.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION OF THE EMBODIMENTS

The following describes in detail embodiments of a lighting control device and a lighting control method according to the present disclosure with reference to the drawings. Note that the embodiments described below show particular examples. The numerical values, elements, the arrangement and connection of the elements, steps, the processing order of the steps, and the like described in the following embodiments are mere examples, and thus are not intended to limit the present disclosure. Therefore, among the elements in the following embodiments, elements not recited in any of the independent claims defining the most generic part of the inventive concept of the present disclosure are described as arbitrary elements that are included in exemplary embodiments.

Figure 1:
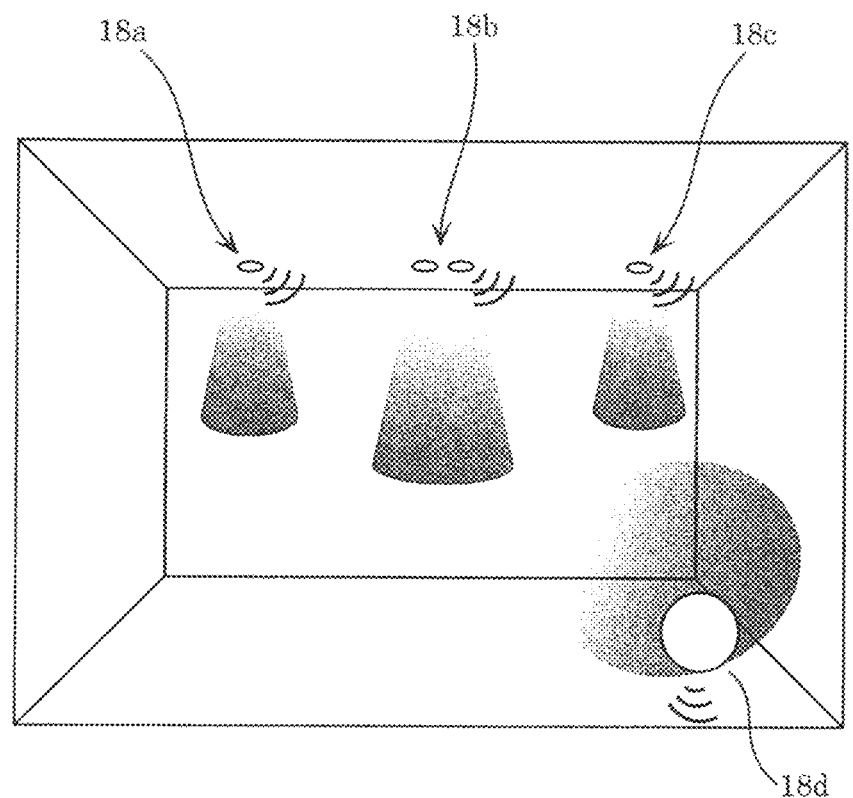
FIG. 1 illustrates a situation where a lighting control device according to the present disclosure is applied.
Figure 1:
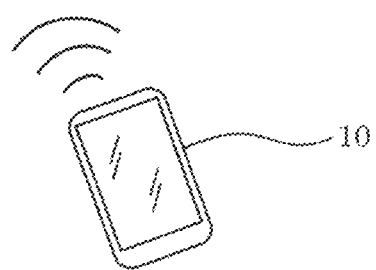

FIG. 1 illustrates a situation where a lighting control device according to the present disclosure is applied. Here, this situation shows that an operator controls four lighting devices 18a to 18d installed in a house, using mobile terminal 10 as a platform for achieving a lighting control device according to the present disclosure, and a color illumination space is created based on an image.

Figure 2:
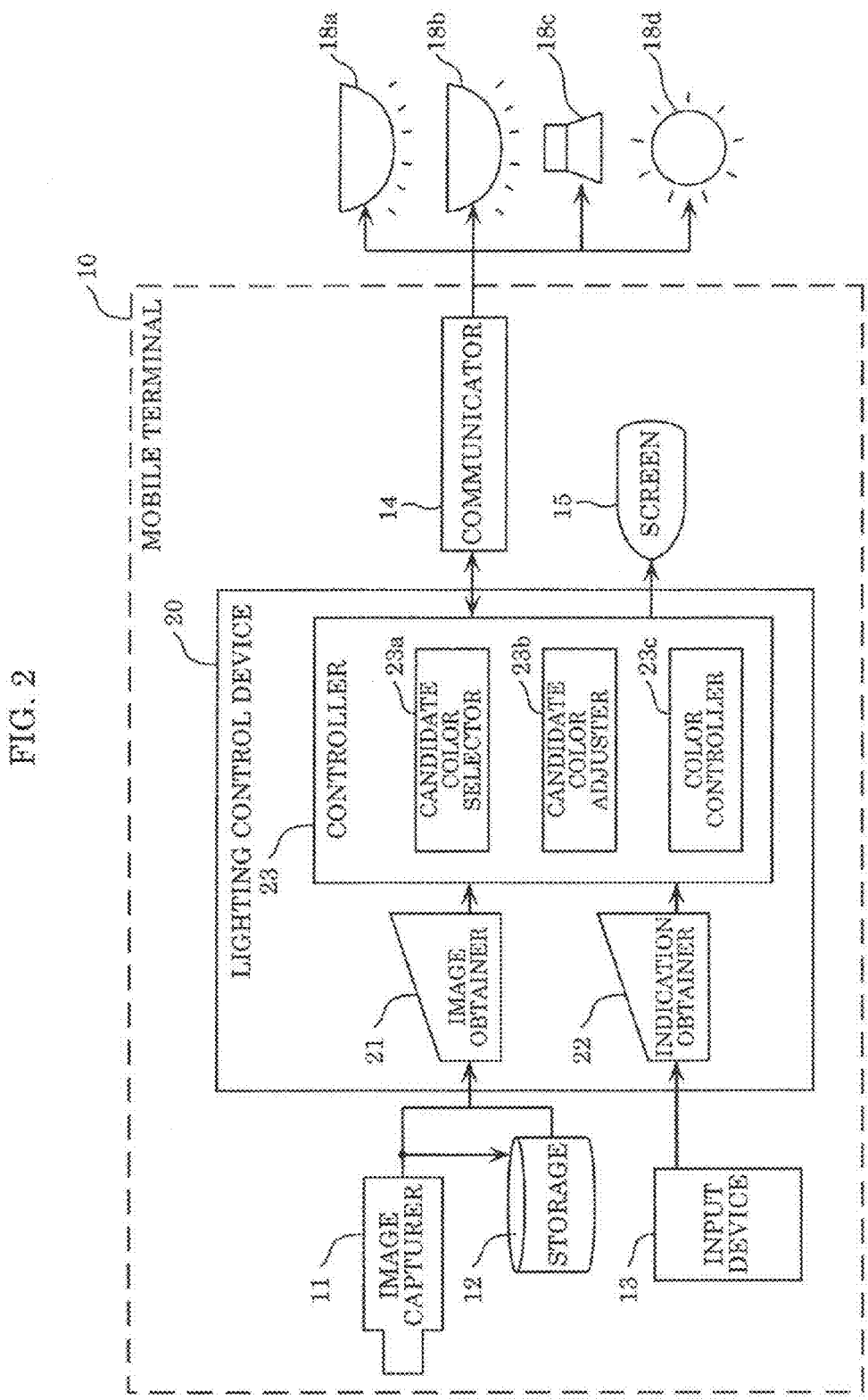
FIG. 2 is a block diagram illustrating a configuration of the lighting control device according to an embodiment of the present disclosure.

FIG. 2 is a block diagram illustrating a configuration of lighting control device 20 according to an embodiment of the present disclosure. Here, FIG. 2 illustrates main elements of mobile terminal 10 serving as a platform for achieving lighting control device 20, and also lighting devices 18a to 18d under the control of lighting control device 20.

Mobile terminal 10 is a portable information device such as a smartphone or a tablet terminal, and includes image capturer 11, storage 12, input device 13, communicator 14, and screen 15 which are resources for lighting control device 20. Image capturer 11 is a camera which includes an image sensor (e.g., complementary metal-oxide-semiconductor (CMOS) or charge-coupled-device (CCD) image sensor) and generates images such as pictures by image capturing. Storage 12 is a non-volatile memory that stores various images including the pictures generated by image capturer 11. Input device 13 is, for example, a touch panel or a button. Communicator 14 is a communication interface which sends a control signal to lighting devices 18a to 18d through wireless communication using a wireless local area network (LAN) or infrared rays, for instance, thus controlling colors and dimming of lighting devices 18a to 18d. Screen 15 is a display device such as a liquid crystal display (LCD).

Each of lighting devices 18a to 18d controls the color and dimming of the lighting device, based on a control signal sent from lighting control device 20, and examples of lighting devices 18a to 18d include a ceiling light, a downlight, a spotlight, a pendant light, a stand light, and a foot light that all include an LED light source.

Lighting control device 20 included in mobile terminal 10 controls lighting devices 18a to 18d, and includes image obtainer 21, indication obtainer 22, and controller 23. Lighting control device 20 is achieved as, for example, an application (application software) which is a program that is executed by a processor (not illustrated), such as a central processing unit (CPU) or a microcontroller, of mobile terminal 10, and performs processing using the above-mentioned resources of mobile terminal 10 if necessary. The application is downloaded from a server apparatus on the Internet to mobile terminal 10.

Image obtainer 21 is a processing unit which obtains an image to be used for creating a color illumination space, and more specifically, receives an image generated through image capturing by image capturer 11 of mobile terminal 10 or reads an image stored in storage 12 of mobile terminal 10.

Indication obtainer 22 is a processing unit which obtains an indication from an operator via input device 13 of mobile terminal 10.

Controller 23 is a processing unit (that performs step (c)) which controls lighting devices 18a to 18d via communicator 14 of mobile terminal 10, and includes candidate color selector 23a, candidate color adjuster 23b, and color controller 23c which are main elements, as illustrated in FIG. 2. Note that step (c) is a step of controlling lighting devices 18a to 18d, and includes: (c-i) selecting, in accordance with an indication obtained from an operator, a plurality of candidate colors to be used for color control of lighting devices 18a to 18d, from an obtained image; (c-ii) making automatic-mode adjustment which is processing for determining colors reproducible by lighting devices 18a to 18d, in accordance with predetermined indexes and based on the plurality of candidate colors selected in step (c-i); and (c-iii) causing lighting devices 18a to 18d to emit illumination light having the colors determined in step (c-ii), by controlling lighting devices 18a to 18d. In addition, controller 23 is, for example, a CPU or a microcontroller which executes a program stored in a non-volatile memory. Functions of candidate color selector 23a, candidate color adjuster 23b, and color controller 23c are achieved by the CPU or the microcontroller executing the program.

Candidate color selector 23a performs, in accordance with the operator's indication obtained by indication obtainer 22, manual-mode processing for selecting a plurality of candidate colors to be used for color control of lighting devices 18a to 18d (step (c-i)) from the image obtained by image obtainer 21. Furthermore, if the operator gives an indication, candidate color selector 23a also makes automatic-mode selection to select candidate colors to be used for color control of lighting devices 18a to 18d, by analyzing the image obtained by image obtainer 21.

Candidate color adjuster 23b makes automatic-mode adjustment (step (c-ii)) which is processing for determining colors reproducible by lighting devices 18a to 18d in accordance with predetermined indexes, based on the plurality of candidate colors selected by candidate color selector 23a. Here, a predetermined index is information in which a suitable color is associated in advance with a type of a lighting device and a position at which the lighting device is disposed, where the suitable color falls within a limited range of a color reproducible depending on the type of a selected lighting device and the position at which the lighting device is disposed, and is a color which can achieve a color illumination space that appears pleasant to human eyes. Candidate color adjuster 23b stores such a predetermined index in storage 12, for example, and refers to and uses the index.

Furthermore, if candidate color adjuster 23b determines a plurality of colors for lighting devices 18a to 18d, candidate color adjuster 23b assigns the plurality of colors to lighting devices 18a to 18d one-by-one, in correspondence with spatial positions of candidate colors in an image which correspond to the plurality of colors. Further, if the operator wishes, candidate color adjuster 23b also makes, to the plurality of candidate colors selected by candidate color selector 23, manual-mode adjustment which is processing for determining colors reproducible by lighting devices 18a to 18d in accordance with the indication obtained by indication obtainer 22. Note that in the present embodiment, when making the automatic-mode adjustment, candidate color adjuster 23b determines brightness, in addition to colors to be reproduced by lighting devices 18a to 18d.

Color controller 23c controls, via communicator 14 of mobile terminal 10, colors of lighting devices 18a to 18d (step (c-iii)) so that lighting devices 18a to 18d emit illumination light having the colors determined by candidate color adjuster 23b. Furthermore, color controller 23c has a preview mode for generating an image showing a state where lighting devices 18a to 18d are each emitting illumination light having the color determined by candidate color adjuster 23b or the color assigned by candidate color adjuster 23b, and displaying the generated image on screen 15 of mobile terminal 10.

Note that in the present embodiment, color controller 23c not only controls colors of lighting devices 18a to 18d, but also dimming of lighting devices 18a to 18d so that lighting devices 18a to 18d emit illumination light having the brightness determined by candidate color adjuster 23b.

Further, as a function, controller 23 not only controls candidate color selector 23a, candidate color adjuster 23b, and color controller 23c, but also receives various settings and controls lighting devices 18a to 18d through interaction with the operator using input device 13 and screen 15 of mobile terminal 10.

Figure 3:
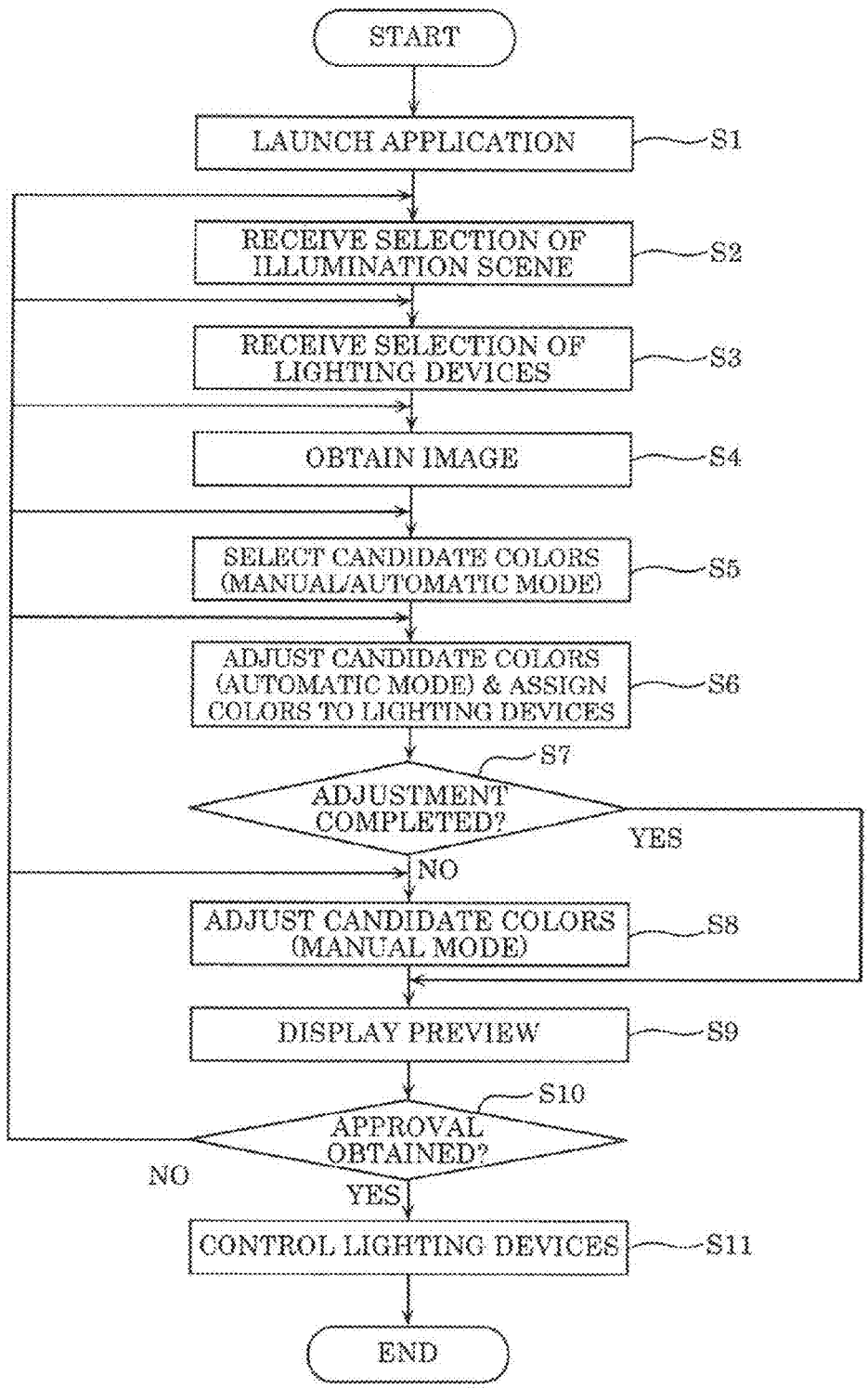
FIG. 3 is a flowchart illustrating operation of the lighting control device according to the embodiment of the present disclosure.

The following describes operation of lighting control device 20 having the above-described configuration according to the present embodiment, with reference to the flowchart illustrated in FIG. 3 and examples of display of screen 15 illustrated in FIGS. 4 to 13.

FIG. 3 is a flowchart illustrating the operation of lighting control device 20 according to the present embodiment, or in other words, a flowchart illustrating a procedure of a control method according to the present disclosure. First, the operator launches an application for lighting control device 20 in mobile terminal 10 (S1 in FIG. 3). This activates lighting control device 20.

When lighting control device 20 is activated, controller 23 displays a menu for selecting an illumination scene to be reproduced in an illumination space, on screen 15 of mobile terminal 10, and receives selection of an illumination scene via indication obtainer 22 (step (b)) (S2 in FIG. 3).

Figure 4:
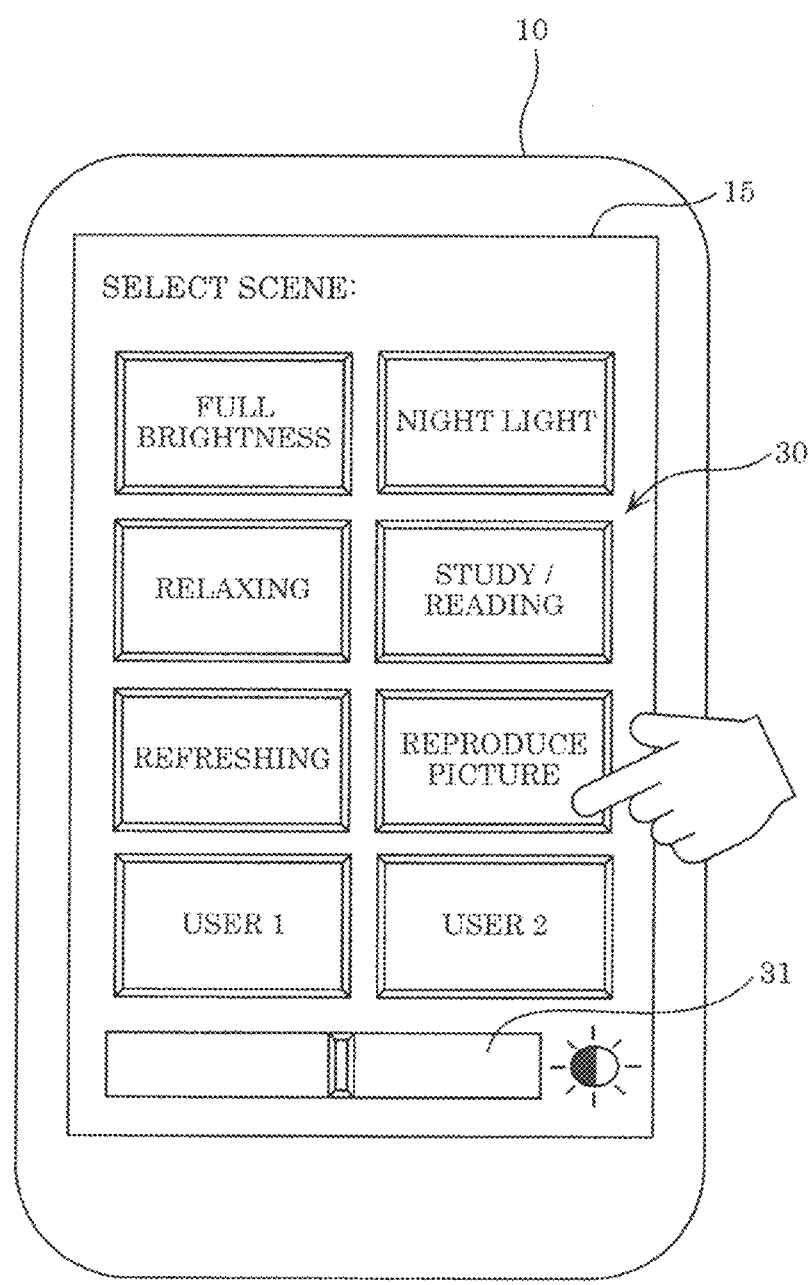
FIG. 4 illustrates an example of a displayed menu for selecting an illumination scene.

FIG. 4 illustrates an example of a displayed menu for selecting an illumination scene. Here, eight selection buttons 30 for selecting illumination scenes (such as "full brightness", "night light", "relaxing", "study/reading", and "refreshing", "reproduce picture", and "user 1"), and slide bar 31 for designating the brightness of an illumination space to be reproduced are displayed. Note that "user 1" and "user 2" indicate illumination scenes which have previously been set by an operator customizing color control and brightness of the scenes and storing the scenes in lighting control device 20. The operator presses one of eight selection buttons 30 for illumination scenes (here "reproduce picture"), and can set desired brightness using slide bar 31 if necessary.

Next, controller 23 interacts with the operator using input device 13 and screen 15 of mobile terminal 10, and receives selection of lighting devices 18a to 18d which are to be controlled, via indication obtainer 22 (S3 in FIG. 3).

Figure 5:
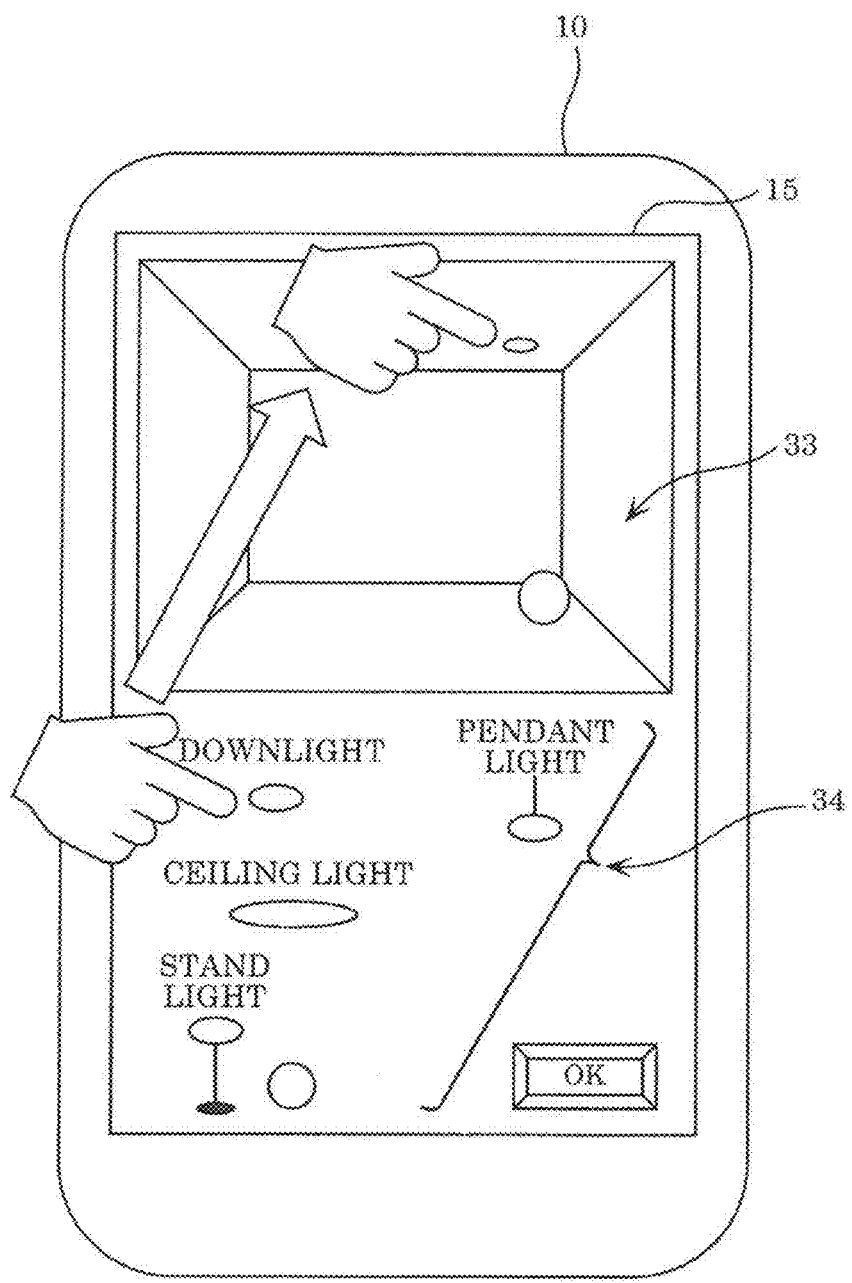
FIG. 5 illustrates an example of display of a screen for selecting a lighting device.

FIG. 5 illustrates an example of display of screen 15 for selecting a lighting device. Controller 23 is in synchronization with lighting devices 18a to 18d which are used for creating an illumination space, based on communication setting (pairing) made in advance (in other words, controller 23 stores communication addresses of lighting devices). Through interaction with the operator, controller 23 receives, for each of lighting devices 18a to 18d in synchronization, designation of a type of the lighting device and a position at which the lighting device is disposed (settings of the lighting device) on the illustration of space 33 which looks like a room, as illustrated in the example of display in FIG. 5. In this example, the operator disposes icon 34 corresponding to the type of a lighting device in space 33, thus determining the type of the lighting device and the position where the lighting device is disposed. When receiving settings of a lighting device on screen 15, controller 23 causes a lighting device in synchronization to blink or causes only the lighting device in synchronization to be turned off, by controlling lighting devices 18a to 18d via communicator 14. This allows the operator to distinguish which lighting device the operator is making a setting for. Note that an image of the inside of the room may be captured using image capturer 11 in a state where lighting devices are on, and the number of the lighting devices and the positions at which the lighting devices are disposed may be determined using the result of capturing such an image.

Figure 6:
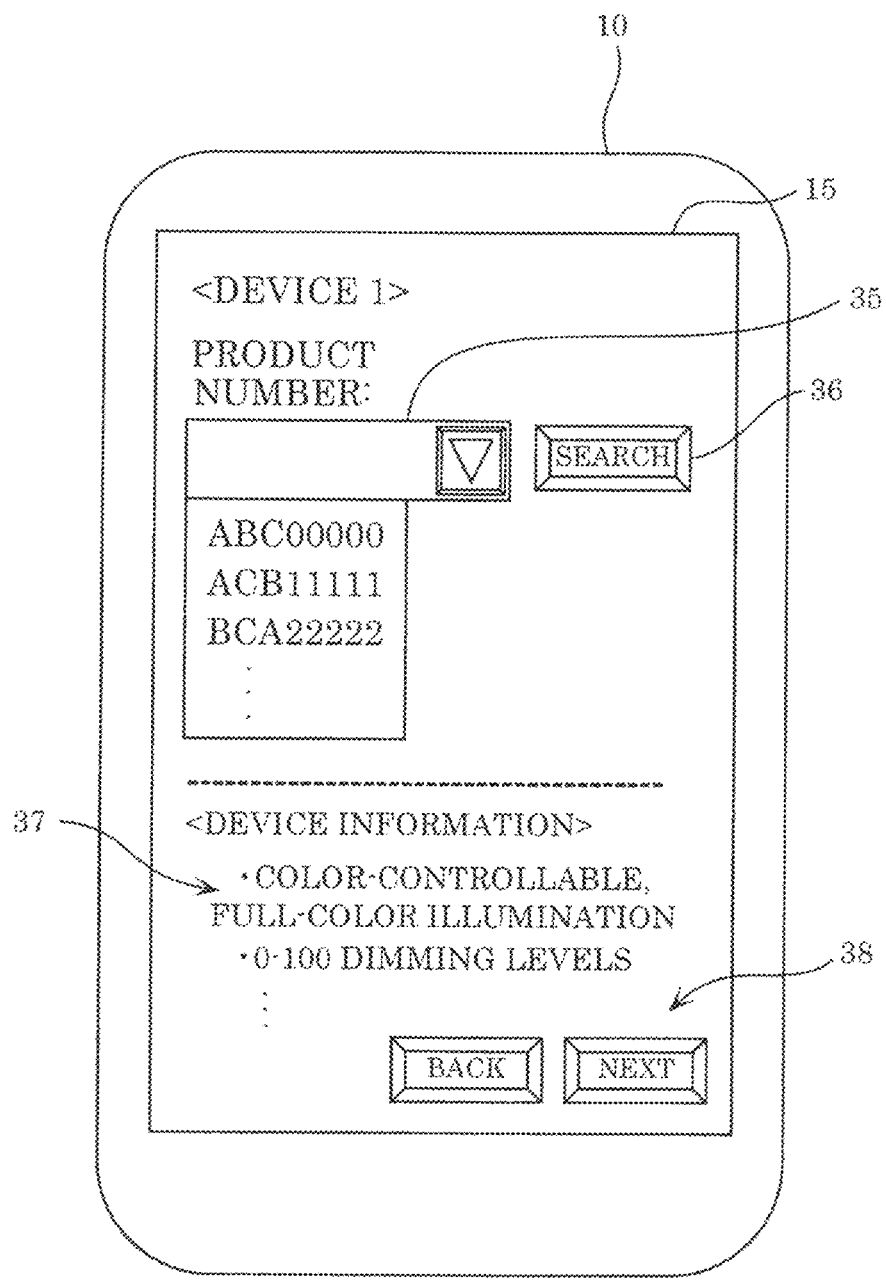
FIG. 6 illustrates another example of display of the screen for selecting a lighting device.

To select a lighting device, as illustrated in the example of display in FIG. 6, the operator can input a product number of a lighting device (input window 35 and search button 36 on screen 15). Controller 23 displays information on a lighting device having the input product number (such as dimming and color control capabilities) (in area 37 on screen 15). This is because how much a picture can be reproduced differs depending on positions where lighting devices are disposed and the number and the type of the lighting devices. A color-controllable and dimmable lighting device which has light-source elements of three primary colors RGB and emits full color light can reproduce substantially all the colors, yet in reality, there are not many cases where an ordinary house adopts a full color lighting device. Further, in general, there is a greater demand for lighting devices which provide warm white lighting, neutral white lighting, and daylight color lighting. From such circumstances, according to lighting control device 20, the operator can be informed of the color which the lighting device can output and the range of brightness (area 37 on screen 15) by inputting, to input window 35, the product number of the actually installed lighting device, as illustrated in the example of display in FIG. 6.

Input window 35 illustrated in FIG. 6 shows a pull-down menu for selecting a corresponding product number from among product numbers listed in alphabetical order. The operator inputs, by key entry, a part or the whole of the product number to input window 35 illustrated in FIG. 6 and presses search button 36 for searching for and finding a correct product number, and as a result, information on a device having the product number searched for is displayed in area 37 illustrated in FIG. 6. Such a search function is fulfilled by a database stored in controller 23 and search processing by controller 23. Note that in area 38 illustrated in FIG. 6, a button for returning to previous display on the screen and a button for determining the product number and moving on to the selection of the next lighting device are displayed.

Figure 7:
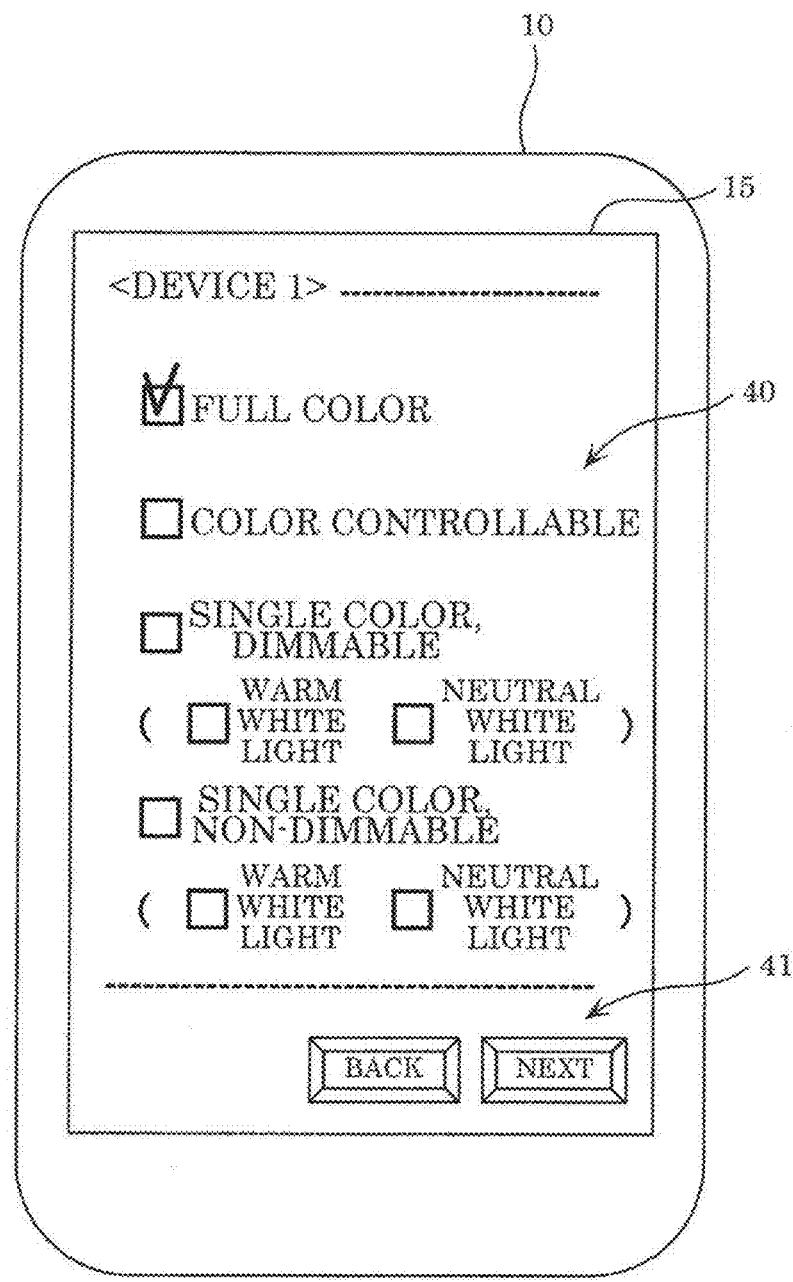
FIG. 7 illustrates yet another example of display of the screen for selecting a lighting device.

Further, with lighting control device 20, the capability (type) of a lighting device can also be selected directly, rather than a product number of the lighting device, as illustrated in the example of display in FIG. 7. Selections include (1) a color-controllable and dimmable, full color type for outputting all RGB (indicated by "FULL COLOR" on screen 15) and (2) a color controllable type for outputting warm white light to neutral white light or daylight color light (indicated by "COLOR CONTROLLABLE" on screen 15). The selections further include (3) a single color, dimmable type for changing only brightness and outputting one of warm white light, neutral white light, and daylight color light (indicated by "SINGLE COLOR, DIMMABLE" on screen 15). The selections further include, for instance, (4) a single color, non-dimmable type for outputting single color light among warm white light, neutral white light, and daylight color light at fixed brightness (indicated by "SINGLE COLOR, NON-DIMMABLE" on screen 15). A menu for making a selection from such types of a lighting device is displayed in area 40 illustrated in FIG. 7. An operator can select the type of a lighting device by putting a mark in a check box via input device 13. Note that a button for returning to a previous display on the screen and a button for determining the device type and moving on to the selection for a next lighting device are displayed in area 41 illustrated in FIG. 7.

Next, image obtainer 21 obtains an image to be used for creating a color illumination space by interacting with the operator using input device 13 and screen 15 of mobile terminal 10 (step (a); S4 in FIG. 3).

Figure 8:
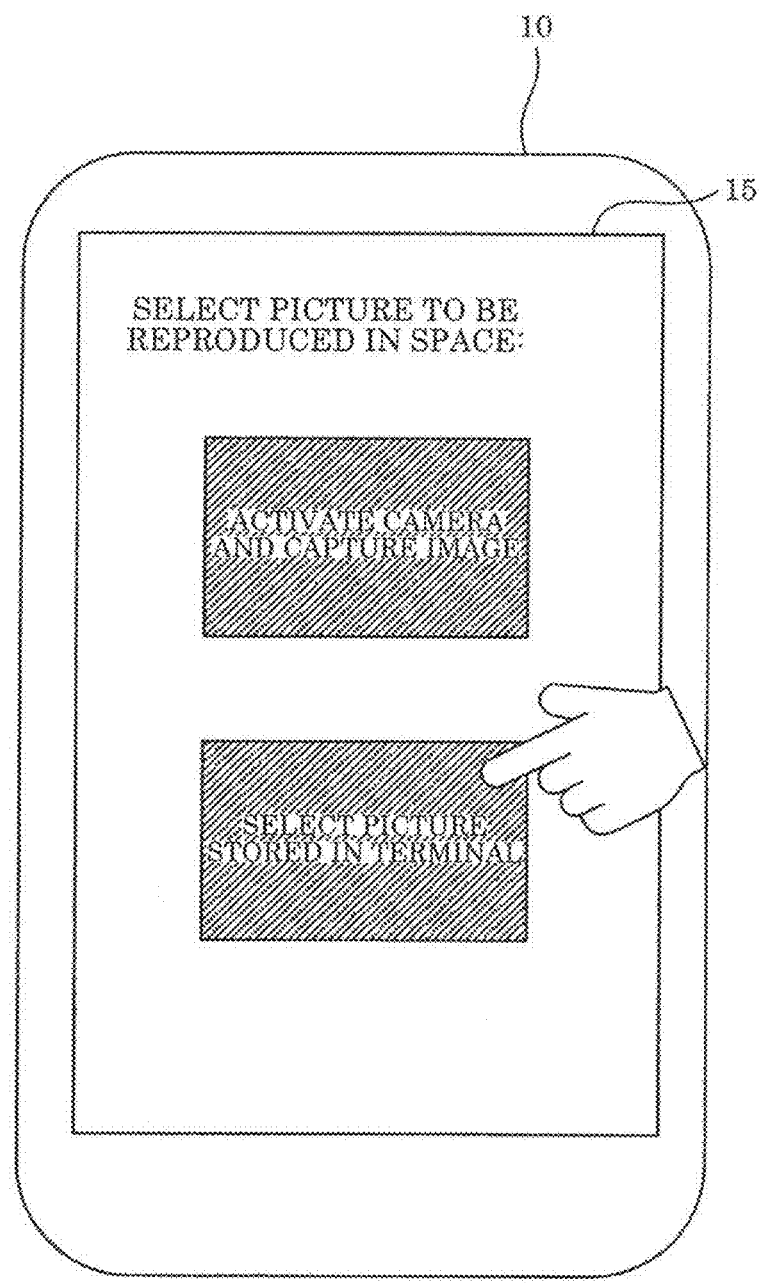
FIG. 8 illustrates an example of display of the screen for selecting where a picture to be used for creating an illumination space is obtained.

FIG. 8 illustrates an example of display on screen 15 for selecting where to obtain a picture to be used for creating an illumination space. Here, a menu is displayed for an operator to select whether to activate a camera (image capturer 11) and capture an image or to select a picture from the inside of the mobile terminal (storage 12), as a method for obtaining a picture to be used for creating an illumination space. In this manner, in accordance with the indication obtained via indication obtainer 22, image obtainer 21 receives a picture generated by image capturing by image capturer 11 of mobile terminal 10 or reads a picture stored in storage 12 of mobile terminal 10.

Figure 9:
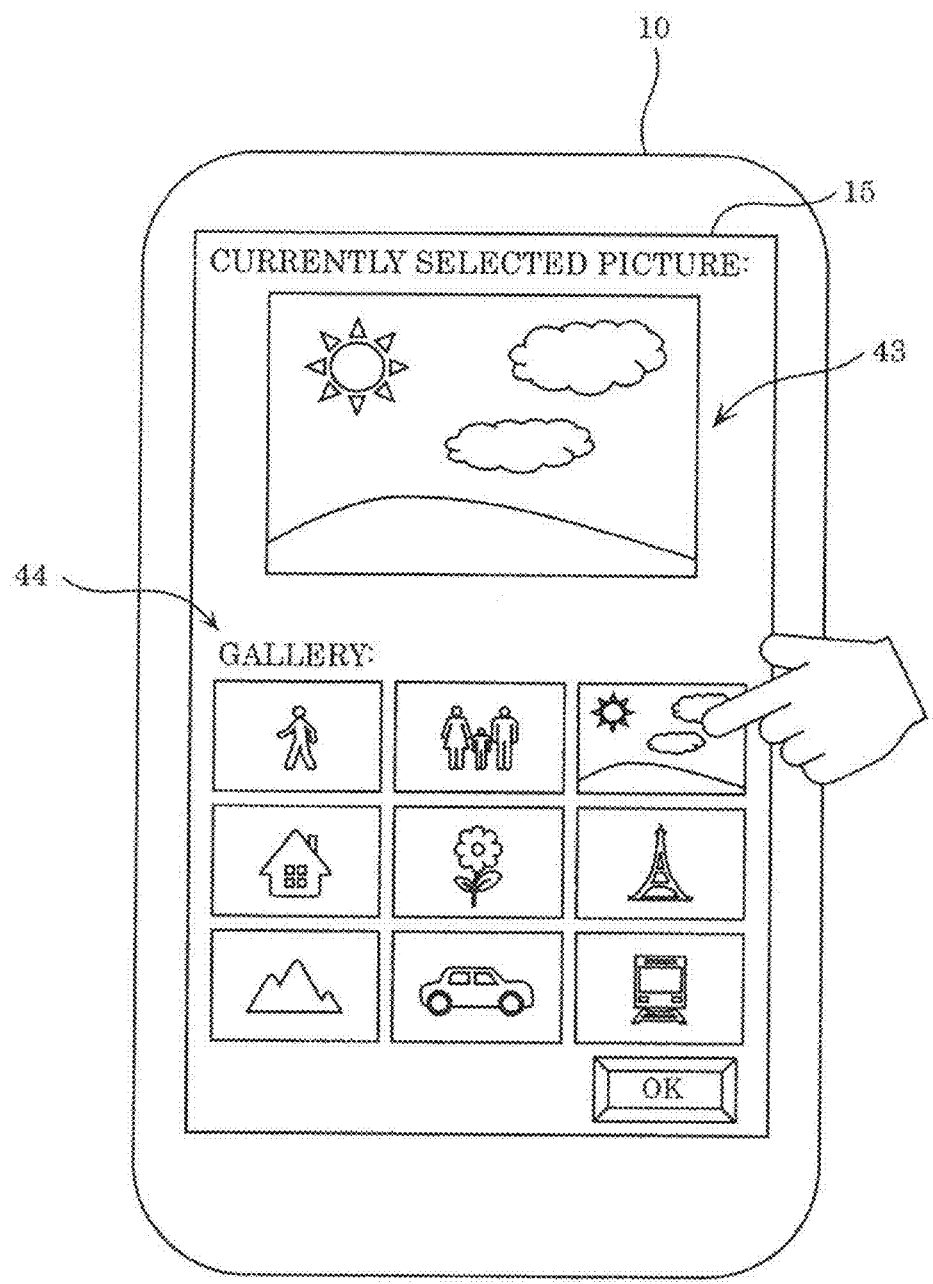
FIG. 9 illustrates an example of display of the screen for selecting one picture from among a plurality of pictures stored in storage.

FIG. 9 illustrates an example of display on screen 15 for selecting one picture from among a plurality of pictures stored in storage 12 of mobile terminal 10. A picture selected from among a plurality of pictures displayed in a "gallery" (area 44) on the screen is displayed in area 43. Note that after selecting one picture, an operator may designate a particular range (particular area) in a picture to be used for creating an illumination space via input device 13. This achieves an increase in a satisfaction level in creation of a color illumination space, by excluding a portion which is not necessary for achieving the color illumination space.

Next, candidate color selector 23a performs manual-mode processing for selecting a plurality of candidate colors to be used for color control of lighting devices 18a to 18d from an image obtained by image obtainer 21, in accordance with an indication from the operator obtained by indication obtainer 22 (step (c-i); S5 in FIG. 3).

Figure 10:
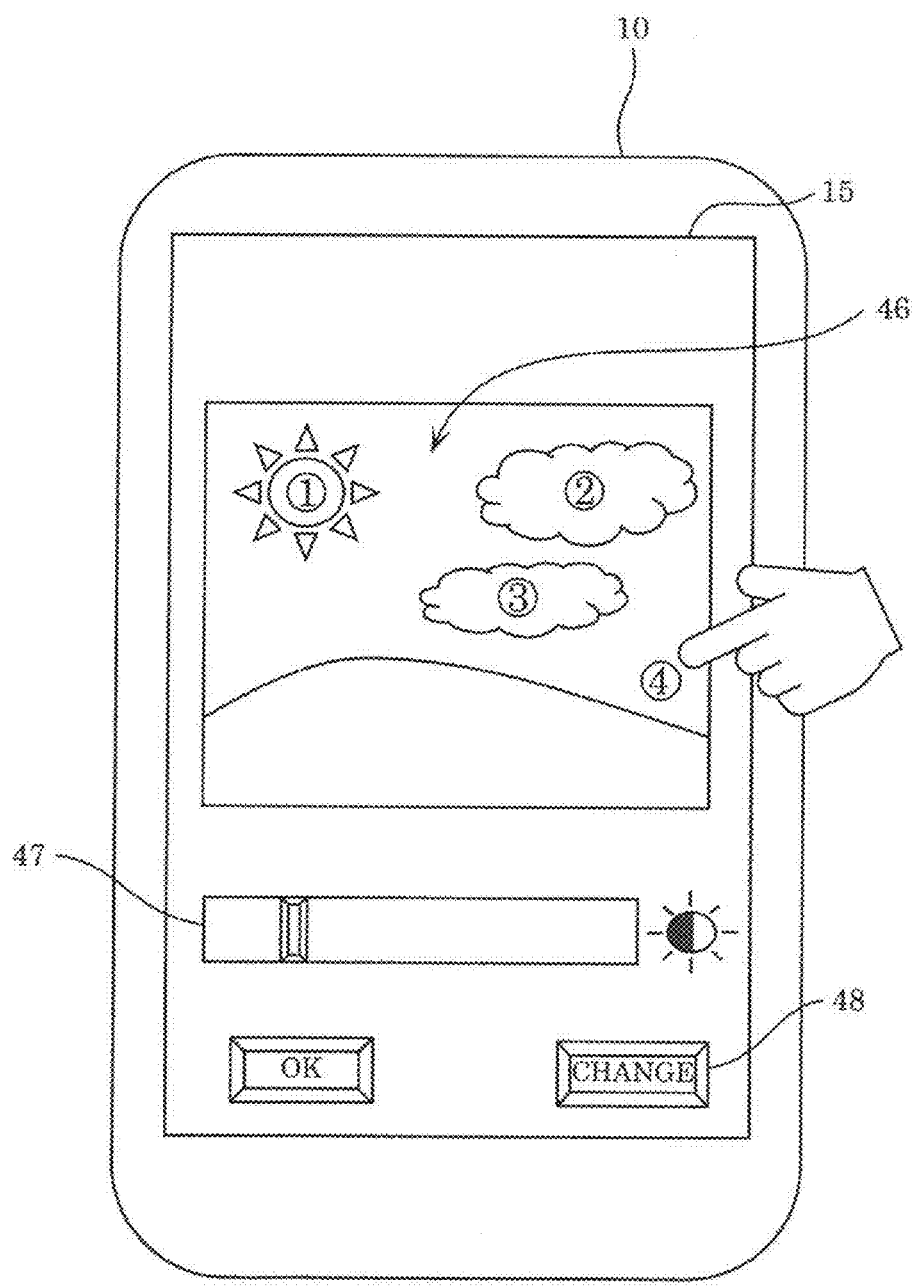
FIG. 10 illustrates an example of display of the screen for selecting, in a manual mode, a plurality of candidate colors to be used for creating an illumination space from the selected picture.

FIG. 10 illustrates an example of display on screen 15 for manual-mode selection for selecting a plurality of candidate colors to be used for creating an illumination space from a selected picture. An operator designates objects in a picture in area 46 of screen 15, thus selecting a plurality of candidate colors to be used for creating an illumination space. Further, the operator can change the white balance of the entire picture by using slide bar 47 displayed on screen 15. The operator can change where a candidate color is selected by pressing change button 48 displayed on screen 15.

Note that candidate color selector 23a makes automatic-mode selection for selecting candidate colors to be used for color control of lighting devices 18a to 18d by analyzing an image obtained by image obtainer 21, if an operator gives indication. In the automatic-mode selection, candidate color selector 23a selects a candidate color automatically, based on a setting made in advance by an operator, using at least one of the following techniques.

Specifically, according to a first technique, if an image obtained by image obtainer 21 is a picture, candidate color selector 23a selects a color of an in-focus area of the picture as a candidate color by referring to digital information included in the picture. According to a second technique, candidate color selector 23a generates a distribution of colors in a color chart by determining a color on a per-block basis from an image obtained by image obtainer 21, and selects a candidate color by preferentially selecting a color that appears frequently (for example, five most frequently appearing colors) in the generated distribution. According to a third technique, candidate color selector 23a selects a predetermined distinctive color, which is a candidate color, from among colors that are obtained by extracting areas from an image obtained by image obtainer 21 (by extracting, through edge detection, distinctive objects such as a cloud, a tree, a house, and an animal). Examples of the predetermined distinctive color include a representative color and a mean color.

Next, candidate color adjuster 23b makes automatic-mode adjustment which is processing for determining colors reproducible by lighting devices 18a to 18d in accordance with predetermined indexes, based on a plurality of candidate colors selected by candidate color selector 23a (step (c-ii); S6 in FIG. 3). In other words, candidate color adjuster 23b refers to an index stored in storage 12 (information in which a suitable color is associated in advance with a type of a lighting device and the position where the lighting device is disposed). Then, candidate color adjuster 23b determines a color for achieving a color illumination space that appears pleasant to human eyes, which falls within a limited range of a color that is reproducible depending on the type of a selected lighting device and the position where the selected lighting device is disposed. Note that in the present embodiment, candidate color adjuster 23b determines not only the colors to be reproduced by lighting devices 18a to 18d, but also brightness when making the automatic-mode adjustment.

More specifically, in the automatic-mode adjustment, candidate color adjuster 23b automatically adjusts a candidate color using at least one of the following techniques in accordance with a predetermined index, based on a setting made in advance by an operator. In other words, according to a first technique, candidate color adjuster 23b makes the automatic-mode adjustment by preferentially selecting, from among a plurality of candidate colors selected by candidate color selector 23a, a candidate color close to the blackbody locus (the Kruithof curve) generally assumed to be suitable for creating a color illumination space.

According to a second technique, if a plurality of lighting devices are controlled, candidate color adjuster 23b makes the automatic-mode adjustment by preferentially selecting, from among a plurality of candidate colors selected by candidate color selector 23a, a plurality of candidate colors having similar colors and a small color difference in a color chart.

According to a third technique, candidate color adjuster 23b makes the automatic-mode adjustment by obtaining, via indication obtainer 22, the indication about the mood which an operator likes, and selecting, from among a plurality of candidate colors selected by candidate color selector 23a, a predetermined color associated with the obtained indication. In other words, the operator selects, via input device 13, a mood which the operator prefers from among, for instance, "relaxing", "vivid", "clear", "exciting", and "colorful". Candidate color adjuster 23b selects colors associated in advance with an input mood. For example, candidate color adjuster 23b selects a color having a small color difference or similar colors from a warm white color to a neutral white color if the selected mood is "relaxing", and is even allowed to select a color having a large color difference if the selected mood is "vivid", "clear", or "colorful". Note that an operator may select the type of activity such as "study", and in this case, candidate color adjuster 23b selects a color such that a correlated color temperature DUV of colored light on a work plane is ±20.

According to a fourth technique, candidate color adjuster 23b obtains information on an object captured in the image via indication obtainer 22, if the image obtained by image obtainer 21 is a picture. Candidate color adjuster 23b makes automatic-mode adjustment by selecting a predetermined color associated with the obtained indication, from among a plurality of candidate colors selected by candidate color selector 23a. For example, an operator inputs information indicating a captured object such as "sea", "sky", and "sunset", via input device 13. In this case, candidate color adjuster 23b selects a color close to a blackbody locus, if the captured object is "sunset", whereas if the captured object is "sky", candidate color adjuster 23b selects a color changed according to a time (or time period) (a color associated in advance with a current time (or time period)).

According to a fifth technique, candidate color adjuster 23b makes automatic-mode adjustment for preferentially selecting a candidate color having a predetermined color from among a plurality of candidate colors selected by candidate color selector 23a, as a color for the current time. For example, candidate color adjuster 23b determines a current time by referring to a timer included in candidate color adjuster 23b, and during the night, lowers the illuminance by selecting a color having a low tone (dark color) in order not to interrupt sleep, whereas during the morning, candidate color adjuster 23b increases the illuminance by selecting a color having a high tone (bright color).

Indexes as described above are prestored in an application (specifically, storage 12) in advance, and an index can be selected from among the indexes when selecting a picture to be reproduced. Further, these indexes differ depending on cultures and preferences. Accordingly, data about color preference may be obtained by, for instance, research conducted in advance for each country, and the indexes may be prepared, reflecting such preference data.

Here, if candidate color adjuster 23b determines a plurality of colors for lighting devices 18a to 18d, candidate color adjuster 23b assigns the plurality of colors to lighting devices 18a to 18d in one-to-one correspondence, according to spatial positions of candidate colors in an image which correspond to the plurality of colors. In other words, candidate color adjuster 23b assigns colors to the lighting devices such that the spatial positions of objects in a picture used for selecting candidate colors correspond to the positions at which lighting devices 18a to 18d are disposed and which have been designated by the operator. For example, if the color of the sun located at the upper left of a picture is selected, candidate color adjuster 23b assigns that candidate color to the lighting device located at the upper left of a room. Further, candidate color adjuster 23b assigns a color which occupies most of the background of a picture to a ceiling light which provides main illumination and a lighting device which provides concentrated illumination, and assigns colors obtained from an in-focus object and a distinctive object to a downlight and a spotlight. Such assignment increases the degree of reproducing the picture. Note that "concentrated illumination" refers to a bright portion at which more illumination is provided than other indoor places, and for example, is illumination for a work plane of a table in a living room, for instance.

Next, controller 23 determines whether adjustment of a candidate color is completed by determining whether indication obtainer 22 has obtained an indication for manual-mode adjustment (S7 in FIG. 3).

As a result, if controller 23 determines that indication obtainer 22 has obtained an indication for manual-mode adjustment (in other words, adjustment of a candidate color is not completed) (NO in S7 in FIG. 3), candidate color adjuster 23b determines that the operator wishes to make manual-mode adjustment. As a result, candidate color adjuster 23b makes manual-mode adjustment (S8 in FIG. 3). In other words, candidate color adjuster 23b makes manual-mode adjustment to a plurality of candidate colors selected by candidate color selector 23a, which is processing for determining a color reproducible by lighting devices 18a to 18d in accordance with the indication obtained by indication obtainer 22. Note that if controller 23 does not determine that indication obtainer 22 has obtained an indication for the manual-mode adjustment (in other words, adjustment of a candidate color is completed) (YES in S7 in FIG. 3), candidate color adjuster 23b does not make the manual-mode adjustment.

Figure 11:
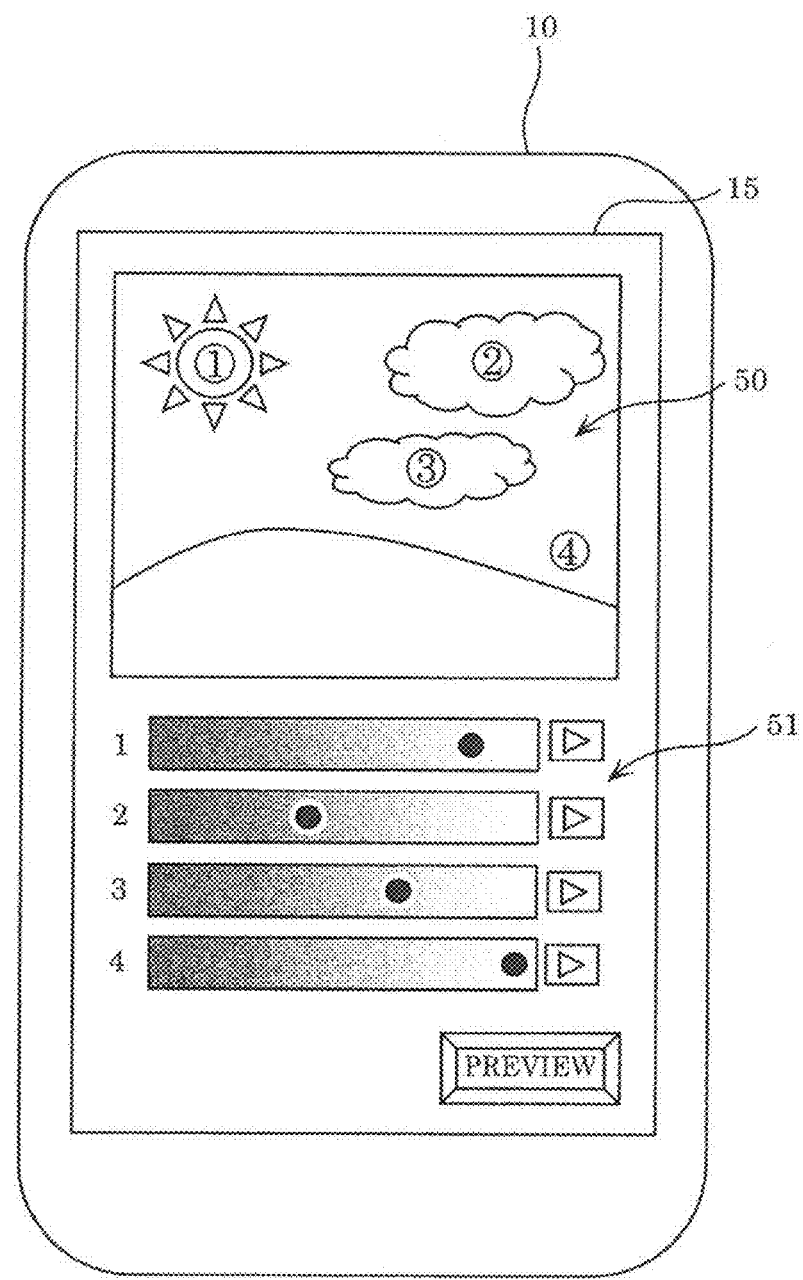
FIG. 11 illustrates an example of display of the screen for making manual-mode adjustment to the candidate colors.

FIG. 11 illustrates an example of display of screen 15 for making manual-mode adjustment to a candidate color. Slide bars for adjusting colors are displayed in area 51 of screen 15, in correspondence with objects in a picture displayed in area 50 of screen 15. Each slide bar shows one selected from among color temperature, hue, luminosity, and saturation. The operator can adjust, using the slide bar, a candidate color designated with the object in a picture.

Next, color controller 23c generates an image indicating a state where lighting devices 18a to 18d are each emitting illumination light having a color determined by candidate color adjuster 23b or a color assigned by candidate color adjuster 23b. Then, color controller 23c executes a preview mode for displaying the generated image on screen 15 of mobile terminal 10 (S9 in FIG. 3).

Figure 12:
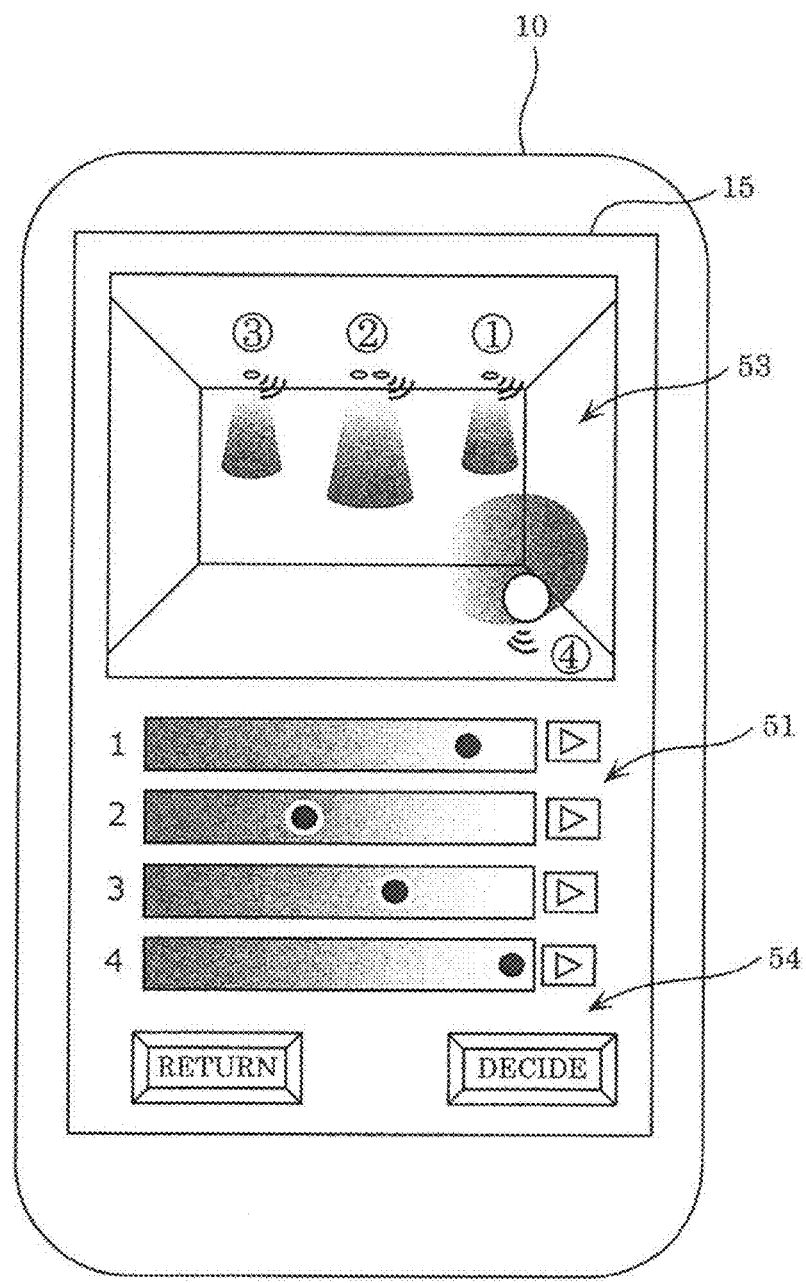
FIG. 12 illustrates an example of display of the screen in a preview mode.

FIG. 12 illustrates an example of display of screen 15 in the preview mode. An image showing the state where lighting devices 18a to 18d are each emitting illumination light having a color determined by candidate color adjuster 23b or a color assigned by candidate color adjuster 23b is displayed in area 53 of screen 15. Before controlling lighting devices 18a to 18d, an operator can check through a so-called simulation whether current settings of adjustment (illumination scene) achieve a desired color illumination space (using the colors and brightness of lighting devices), by looking at the image displayed in area 53 of screen 15. If the displayed image does not show a desired color illumination space, the operator can adjust a color and brightness using the slide bars for adjusting the colors displayed in area 51 on screen 15, in a similar manner as step S8 described above. This adjustment is immediately reflected in the image in the preview mode displayed in area 53 of screen 15. The operator who has checked the image in such a preview mode and has made adjustment presses the "decide" button or the "return" button displayed in area 54 of screen 15, according to whether a desired color illumination space has been achieved.

In response, controller 23 determines via indication obtainer 22 whether approval has been obtained from the operator (whether the operator has agreed that the adjustment is completed) (which one of the "decide" button and the "return" button in FIG. 12 has been pressed) (S10 in FIG. 3). If approval has not been obtained from the operator (NO in S10 in FIG. 3), controller 23 repeats a series of adjustment processes (S2 to S9 in FIG. 3).

On the other hand, if approval is obtained from the operator (YES in S10 in FIG. 3), color controller 23c controls lighting devices 18a to 18d. In other words, color controller 23c controls colors of lighting devices 18a to 18d via communicator 14 of mobile terminal 10 such that lighting devices 18a to 18d each emit illumination light having the color determined by candidate color adjuster 23b (step (c-iii); S11 in FIG. 3). Note that in the present embodiment, color controller 23c not only controls the colors of lighting devices 18a to 18d, but also controls dimming of lighting devices 18a to 18d such that lighting devices 18a to 18d emit illumination light having the brightness determined by candidate color adjuster 23b.

As a result, the operator can achieve a desired color illumination space using lighting devices 18a to 18d, based on an image such as a picture.

Figure 13:
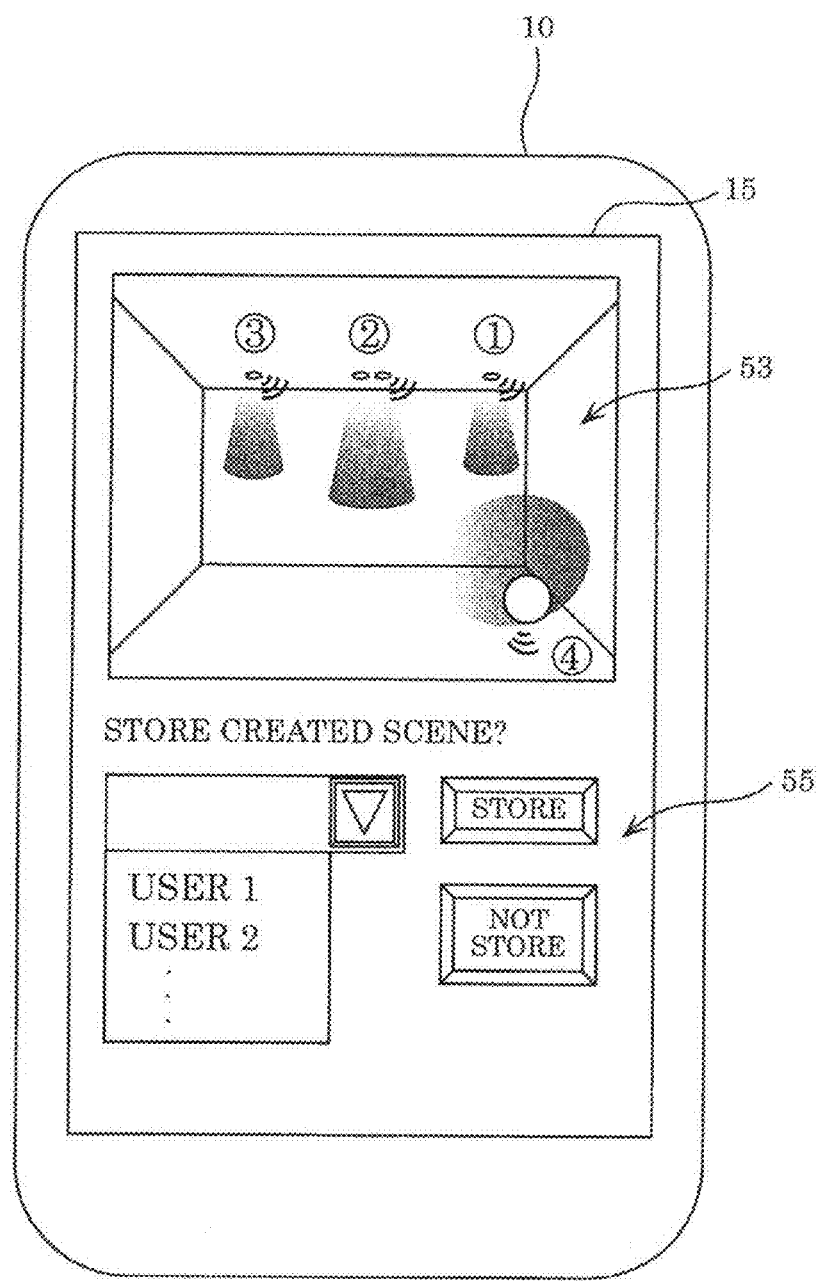
FIG. 13 illustrates an example of display of the screen provided after approval is given based on a check in the preview mode.

FIG. 13 illustrates an example of display of screen 15 provided after approval is given based on a check in the preview mode. An image in the preview mode is displayed in area 53 of screen 15, whereas an operation menu for storing a current adjustment setting (illumination scene) is displayed in area 55 of screen 15. The operator can give a desired name (such as "user 1") to a current adjustment setting (illumination scene) using this operation menu, and store the settings in, for instance, storage 12. The adjustment setting (illumination scene) stored here is displayed as one of selection buttons 30 in the menu for selecting an illumination scene, as illustrated in FIG. 4.

As described above, lighting control device 20 according to the present embodiment is included in mobile terminal 10 and controls lighting devices 18a to 18d. Lighting control device 20 includes image obtainer 21 which obtains an image, indication obtainer 22 which obtains an indication from an operator, and controller 23 which controls lighting devices 18a to 18d. Controller 23 includes candidate color selector 23a, candidate color adjuster 23b, and color controller 23c. Candidate color selector 23a selects, in accordance with an indication obtained by indication obtainer 22, a plurality of candidate colors to be used for color control of lighting devices 18a to 18d, from an image obtained by image obtainer 21. Candidate color adjuster 23b makes automatic-mode adjustment which is processing for determining colors reproducible by lighting devices 18a to 18d, in accordance with predetermined indexes, based on the plurality of candidate colors selected by candidate color selector 23a. Color controller 23c controls lighting devices 18a to 18d such that lighting devices 18a to 18d each emit illumination light having the color determined by candidate color adjuster 23b.

In this manner, a plurality of candidate colors are selected from an image in accordance with an indication from an operator, and the automatic-mode adjustment is made to the plurality of selected candidate colors in accordance with the predetermined indexes. Then, the adjusted candidate colors are reflected in the control of lighting devices 18a to 18d. Thus, while providing an operator with flexibility for selection, an illumination space that appears pleasant to human eyes can be achieved automatically.

Here, color candidate selector 23a makes automatic-mode selection for selecting color candidates to be used for color control of lighting devices 18a to 18d, by analyzing an image. Specifically, color candidate selector 23a selects at least one of (1) a color of an in-focus area of the image as one of the plurality of candidate colors if the image is a picture, (2) a candidate color among the plurality of candidate colors by generating a distribution of colors in a color chart from the image and preferentially selecting a color that frequently appears in the generated distribution, and (3) a predetermined distinctive color, as one of the plurality of candidate colors, from among one or more colors obtained by extracting one or more areas from the image. In this manner, a color candidate is automatically extracted using an image.

Further, color candidate adjuster 23b makes the automatic-mode adjustment by at least one of (1) preferentially selecting a candidate color close to a blackbody locus from among the plurality of candidate colors, (2) preferentially selecting a plurality of candidate colors having a small color difference in a color chart, from among the plurality of candidate colors if lighting control device 20 controls plural lighting devices 18a to 18d, (3) obtaining an indication about a mood which the operator prefers via indication obtainer 22, and selecting a predetermined color associated with the obtained indication from among the plurality of candidate colors, (4) obtaining, if the image is a picture, information on an object captured in the image via indication obtainer 22, and selecting a predetermined color associated with the obtained indication from among the plurality of candidate colors, and (5) preferentially selecting a candidate color having a predetermined color for a current time, from among the plurality of candidate colors.

In this manner, a color candidate is adjusted automatically in accordance with an index for achieving an illumination space which appears pleasant to human eyes. Accordingly, even if an operator does not have sufficient knowledge about lighting, the operator can obtain a pleasant illumination space while being satisfied by making selection by the operator him/herself.

Color candidate adjuster 23b further makes manual-mode adjustment to the plurality of candidate colors selected by candidate color selector 23a, the manual-mode adjustment being processing for determining colors reproducible by lighting devices 18a to 18d in accordance with the indication obtained by indication obtainer 22. In this manner, as the complement to the automatic adjustment to the color candidates, fine adjustment, for instance, is made manually, thus increasing the level of satisfaction with a created color illumination space.

Lighting control device 20 controls plural lighting devices 18a to 18d, and candidate color adjuster 23b determines a plurality of colors by making the automatic-mode adjustment, and assigns the plurality of colors to plural lighting devices 18a to 18d in correspondence with spatial positions of candidate colors in the image which correspond to the plurality of colors. In this manner, a color illumination space close to a space having colors in the image is achieved using lighting devices 18a to 18d.

Color controller 23c generates an image showing a state where lighting devices 18a to 18d are emitting illumination light having the colors determined by candidate color adjuster 23b or colors assigned by candidate color adjuster 23b, and displays the generated image on a screen of mobile terminal 10. Such a preview-mode display allows the operator to check on screen 15 details of current adjustment (illumination scene), before controlling lighting devices 18a to 18d.

Although the above has described the lighting control device and the lighting control method according to the present disclosure based on the embodiment, the present disclosure is not limited to those embodiments. The scope of the present disclosure includes various modifications to the embodiments, which may be conceived by those skilled in the art or forms constructed by combining some elements in the embodiment, without departing from the gist of the present disclosure.

For example, although in the above embodiment, color candidate selector 23a not only selects a color candidate in the manual mode, but also selects a color candidate in the automatic mode, color candidate selector 23a does not necessarily select a color candidate in the automatic mode. Even if color candidate selector 23a operates in the manual mode, color candidate adjuster 23b can subsequently determine a color which is included in a color range limited by, for instance, the type of a selected lighting device, and achieves a color illumination space that appears pleasant to human eyes, by making automatic-mode adjustment to a color candidate in accordance with a predetermined index.

Further, in the above embodiment, although color candidate adjuster 23b makes not only the automatic-mode adjustment to a color candidate, but also the manual-mode adjustment to a color candidate, color candidate adjuster 23b does not necessarily need to make the manual-mode adjustment to a color candidate. This is because the automatic-mode adjustment made to a color candidate by color candidate adjuster 23b contributes to the determination of a color that achieves a color illumination space that appears pleasant to human eyes, to a certain extent.

Further, although color controller 23c automatically assigns a color adjusted by color candidate adjuster 23b to a lighting device in the above embodiment, such an assignment function is not necessarily provided. This is because the operator can also give an indication via input device 13.

In the above embodiment, although color controller 23c provides check display in the preview mode, such check display in the preview mode is not necessarily provided. For example, if an operator selects and reproduce an illumination scene created before and stored by the operator (indicated by, for example, a selection button such as "user 1"), the operator has already checked the illumination scene before, and thus does not need to check the scene in the preview mode.

Further, the present disclosure can be achieved not only as the lighting control device and the lighting control method according to the embodiment above, but also as a program which achieves the functions of the controller of the lighting control device. Furthermore, the present disclosure can be achieved as a computer-readable recording medium such as a DVD in which the program is stored.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A lighting control device which is included in a mobile terminal and controls a lighting device, the lighting control device comprising:
    an image obtainer which obtains an image;
    an indication obtainer which obtains an indication from an operator; and
    a controller which controls the lighting device,
    wherein the controller includes:
    a candidate color selector which selects, in accordance with the indication obtained by the indication obtainer, a plurality of candidate colors to be used for color control of the lighting device, from the image obtained by the image obtainer;
    a candidate color adjuster which makes automatic-mode adjustment which is processing for determining a color reproducible by the lighting device, in accordance with a predetermined index and based on the plurality of candidate colors selected by the candidate color selector; and
    a color controller which causes the lighting device to emit illumination light having the color determined by the candidate color adjuster, by controlling the lighting device.

2. The lighting control device according to claim 1, wherein
    the candidate color selector further analyzes the image in selecting the plurality of candidate colors to be used for color control of the lighting device.

3. The lighting control device according to claim 2, wherein
    the candidate color selector selects at least one of
    (1) a color of an in-focus area of the image as one of the plurality of candidate colors if the image is a picture,
    (2) a candidate color among the plurality of candidate colors by generating a distribution of colors in a color chart from the image and preferentially selecting a color that frequently appears in the generated distribution, and
    (3) a predetermined distinctive color, as one of the plurality of candidate colors, from among one or more colors obtained by extracting one or more areas from the image.

4. The lighting control device according to claim 1, wherein
    the candidate color adjuster makes the automatic-mode adjustment by at least one of
    (1) preferentially selecting a candidate color close to a blackbody locus from among the plurality of candidate colors, (2) preferentially selecting a plurality of candidate colors having a small color difference in a color chart, from among the plurality of candidate colors if the lighting control device controls a plurality of lighting devices, (3) obtaining an indication about a mood which the operator prefers via the indication obtainer, and selecting a predetermined color associated with the obtained indication from among the plurality of candidate colors, (4) obtaining, if the image is a picture, information on an object captured in the image via the indication obtainer, and selecting a predetermined color associated with the obtained indication from among the plurality of candidate colors, and (5) preferentially selecting a candidate color having a predetermined color for a current time, from among the plurality of candidate colors.

5. The lighting control device according to claim 1, wherein
the candidate color adjuster further makes manual-mode adjustment to the plurality of candidate colors selected by the candidate color selector, the manual-mode adjustment being processing for determining a color reproducible by the lighting device in accordance with the indication obtained by the indication obtainer.

6. The lighting control device according to claim 1, wherein
the lighting control device controls a plurality of lighting devices, and
the candidate color adjuster determines a plurality of colors by making the automatic-mode adjustment, and assigns the plurality of colors to the plurality of lighting devices in correspondence with spatial positions of candidate colors in the image which correspond to the plurality of colors.

7. The lighting control device according to claim 1, wherein
the color controller generates an image showing a state where the lighting device is emitting illumination light having the color determined by the candidate color adjuster or a color assigned by the candidate color adjuster, and displays the generated image on a screen of the mobile terminal.

8. A lighting control method for controlling a lighting device using a mobile terminal, the lighting control method comprising:
(a) obtaining an image;
(b) obtaining an indication from an operator; and
(c) controlling the lighting device,
wherein step (c) includes:
(c-i) selecting, in accordance with the indication obtained in step (b), a plurality of candidate colors to be used for color control of the lighting device, from the image obtained in step (a);
(c-ii) making automatic-mode adjustment which is processing for determining a color reproducible by the lighting device, in accordance with a predetermined index and based on the plurality of candidate colors selected in step (c-i); and
(c-iii) causing the lighting device to emit illumination light having the color determined in step (c-ii), by controlling the lighting device.

9. A non-transitory computer-readable recording medium storing a program for controlling a lighting device using a mobile terminal, the program including the lighting control method according to claim 8.

* * * * *